Jan. 8, 1952      J. O. FORSTER      2,581,399

THREAD INSERT FOR MOLDED OR CAST MATERIAL

Filed Nov. 3, 1947      2 SHEETS—SHEET 1

INVENTOR.
JOHN O. FORSTER
BY

ATTORNEY.

Jan. 8, 1952 — J. O. FORSTER — 2,581,399
THREAD INSERT FOR MOLDED OR CAST MATERIAL
Filed Nov. 3, 1947 — 2 SHEETS—SHEET 2

INVENTOR.
JOHN O. FORSTER
BY
ATTORNEY.

Patented Jan. 8, 1952

2,581,399

UNITED STATES PATENT OFFICE 2,581,399

THREAD INSERT FOR MOLDED OR CAST MATERIAL

John O. Forster, Long Island City, N. Y., assignor, by mesne assignments, to Heli-Coil Corporation, Long Island City, N. Y., a corporation of Delaware Application November 3, 1947, Serial No. 783,823

1 Claim. (Cl. 85—32)

The present invention relates to screw thread inserts in connection with molded or cast material of relatively low tensile strength. In the volume production of many articles of use, a material of relatively low strength is cast into moulds under high pressure. Such materials are e. g. alloys containing tin, lead, aluminum, magnesium, or they belong to the group of materials generally denoted as plastics. All the materials here contemplated have in common that a screw threading provided therein is not or only very little resistant to a repeated screwing in and out of a mating bolt. In consequence, it is conventional practice to line holes in such materials, with internally threaded tubular bushings of a higher resistance value, or with wire coil inserts which constitute an inner as well as an outer threading. Both types of bushings or inserts have objectionable drawbacks. The first one requires relatively large holes to accommodate the bushing, and the bushing is either not securely anchored in the hole of the article or it cannot be readily replaced once it has become defective. The second, in one of the conventional forms of the wire cross-sections used in such coils, requires the tapping of the hole that means an additional operation costing time and money in the production of the article.

The invention aims to overcome or at least minimize such drawbacks at least in such connections where the load on the threading in an axial direction is not too high. The invention consists essentially in a wire coil, originally wound with an outer diameter slightly larger than the hole for which it is destined. The cross-section of the coil wire has such an outer face or flank that the coil can be forced into the hole in axial direction wherein the rim of the hole in cooperation with said flank will cause, in wedge-fashion, a contraction of the coil convolutions sufficient to permit the originally oversized coil to enter the hole in its total length. Furthermore, according to the invention, an edge of the mentioned face is provided which will tend to penetrate into the material surrounding the hole, and such tendency may be increased by radial pressure exercized from within either by a tool or by the screw bolt used in the screw connection between the article and another member. Means may also be provided to increase the resistance of the insert to forces tending to turn it in its hole, when such tool or bolt is applied either temporarily or permanently. For this purpose, the mentioned face and edge may be interrupted by a series of recesses so that teeth-like projections are formed, each tooth including a portion of the mentioned edge which is helically curved, and flanks in planes at an angle to the edge.

Further objects and details of the invention will be apparent from the description given hereinafter and the accompanying drawing illustrating embodiments thereof by way of example.

Figure 2:
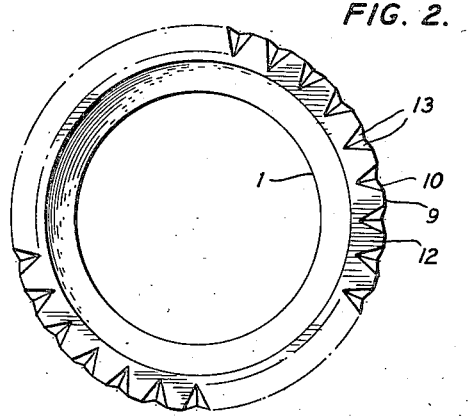
Fig. 2 is a top plan view thereof.
Figure 3:
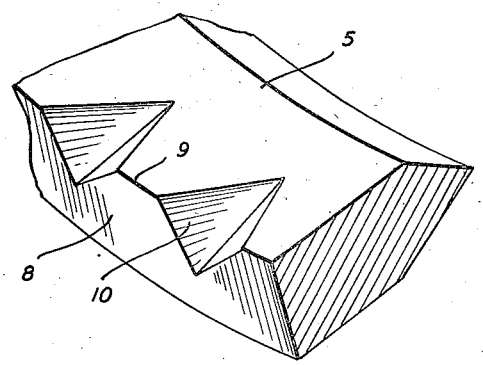
Figure 1:
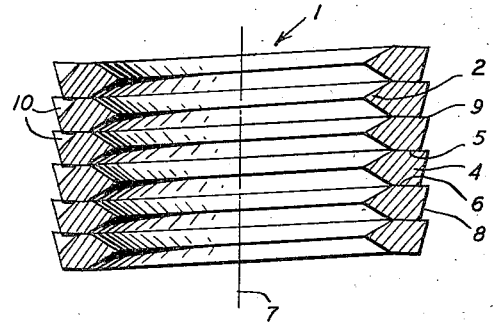
Fig. 1 is a longitudinal cross-section of a coil according to the invention.
Figure 4:
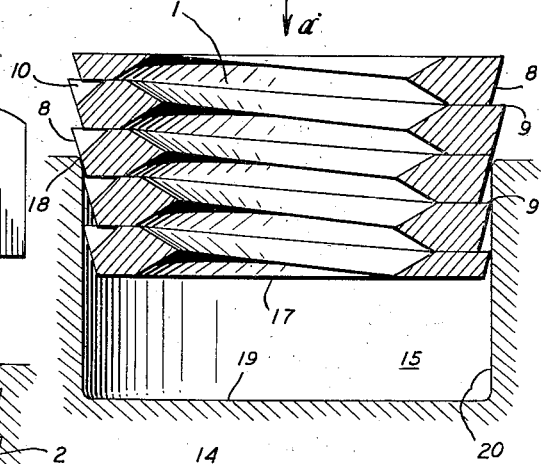
Figure 5:
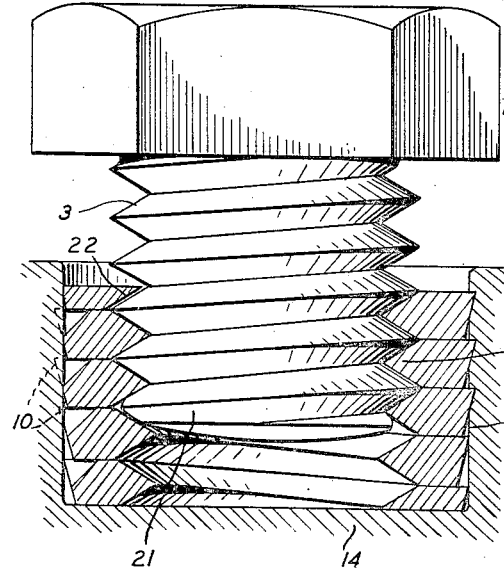
Figure 6:
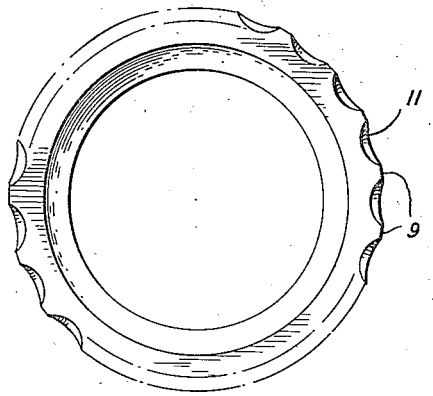
Figure 9:
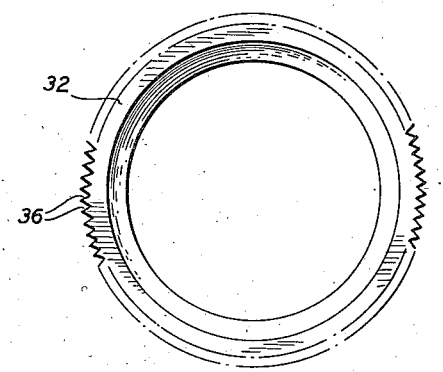
Figure 7:
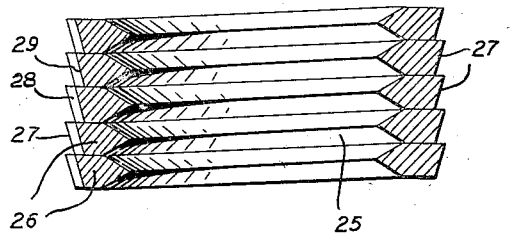
Figure 8:
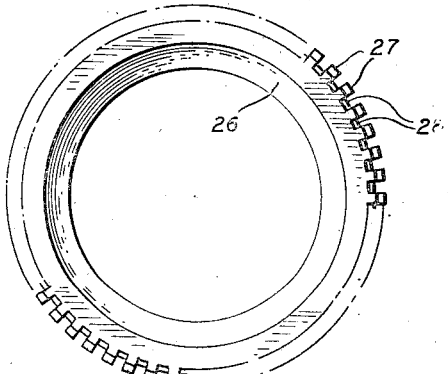
Figure 10:
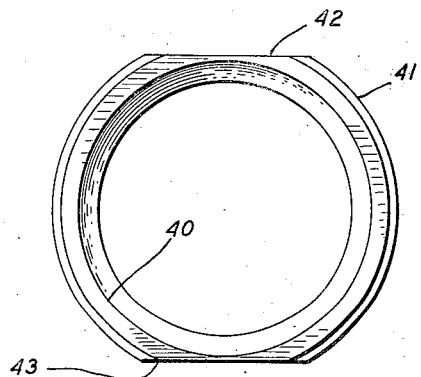

Fig. 3 is a perspective view on an enlarged scale of one of the mentioned teeth, Fig. 4 is an illustration of the effect of the rim of a hole on the outer face of the wire cross-section during the insertion of the coil of Fig. 1, Fig. 5 shows the expansion of the coil of Fig. 4 after it has been fully inserted, Fig. 6 is a top plan view of a coil of a similar wire cross-section but with a modified form of the recesses, Fig. 7 is a longitudinal cross-section of a coil with different wire cross-section, Fig. 8 is a top plan view of the coil of Fig. 7, Fig. 9 is a plan view of still another coil, and Fig. 10 is a bottom plan view on a cool of a wire cross-section similar to that of Fig. 7 with planed outer surfaces rather than recesses.

Referring now to the drawing Figs. 1 to 5, a cylindrical coil 1 is wound of a wire with a cross-section having an inner thread-forming portion 2 which is shaped according to the threading of a bolt or screw 3 as shown in Fig. 5. In the illustrated example the portion is triangular, but it may be e. g. round or may have any other desired configuration. The triangular portion is based on an outer portion 4 which is preferably bordered by two parallel lines 5 and 6 at right angles to the axis 7 of the coil, and by a line 8 which, and this is important, is inclined with respect to the axis 7. Hence, each convolution of the coil has a tapering outer face giving the coil a zig-zag appearance with a helical edge 9 projecting in radial direction with respect to the axis 7 of the coil. The angle of said outer face with respect to the coil axis may be selected within fairly wide limits under consideration of such factors as the friction value between the materials of the coil wire and of the boss into which the coil is to be inserted, furthermore of the sharpness of the edge necessary to penetrate into the boss member, and the depth to which the edge is to be forced into the material of the boss as it will be described hereinafter. In any event, the inclination of the mentioned face should be such that a force acting in axial direction on the circumference of the face will cause a contraction of the coil. I have found that in most instances an angle between 15 and 30 degrees is appropriate. This edge 9 may be provided with recesses 10 which may be produced by a tool having a cutting edge of any desired form, e. g. triangular, to shape the recess 10 in the case of Figs. 2 and 3, or rounded, to shape the recesses 11 as shown in Fig. 6. The recesses may be provided throughout the entire coil or only in a selected portion of it, either before, during, or after the coiling of the wire. In this manner teeth 12 may be formed having an edge 9 from which a frontal or outer face extends at a relatively small angle with respect to the coil axis, and having flanks 13 at an angle with respect to said face. It will be noted that the flanks 13 are symmetrical with respect to the center line of each recess, whereby the teeth will resist, with equal force, turns of the inserted coil in either direction.

The insert coil 1 may be applied to a boss member in the manner illustrated in Figs. 4 and 5. The boss 14 is provided with a cylindrical hole 15 which may but need not be a blind hole as shown. The coil 1 to be used for lining such hole is wound with a minimum outer diameter of its convolutions, as appearing in Fig. 4 in the upper coil portion corresponding to or a little smaller than the inner diameter of the hole. If now the coil is pushed with its leading end 17 into the hole in the direction of the arrow a, the top rim 18 of the latter will cooperate with the tapering faces 8 of the coil convolution to cause a wedging action which contracts the coil as the latter advances towards the bottom 19 of the hole. Thereby the diameter of the edge 9 will be reduced to that of the hole so that the coil can be fully inserted to the desired position more or less below the rim 18, or if the hole is blind, until it bears on the bottom of the hole. Owing to the resiliency of the coil wire, there will be the tendency of the edge 9 of digging into the wall 20 of the hole 15. This effect will be increased by the application of an expanding tool of any suitable and conventional type, as for instance disclosed in U. S. Patent 2,325,508, or the screw 3 or stud proper to be used in the connection of the boss and an extraneous part, may serve as such expanding tool. The expansion serves the dual purpose, first, of safely embedding the edge 9 in the wall 20 as clearly shown in Fig. 5, and second, of correctly sizing the threading formed by the inner wire portions 2. The embedded edge 9 resists a pull tending to withdraw the coil in an axial direction from the hole when the screw connection is subjected to a load. In this connection, it is also to be noted that any force applied to the screw will have a tendency to spread the coil diametrically, adding to the locking effect. As compared to conventional bushings, this is another advantage of this coil insert. If the edge is provided with recesses such as e. g. recesses 10 or 11, the flanks of the teeth formed thereby will also increase the resistance of the coil to forces tending to turn it, so that it is secured against any movement relatively to the boss.

It will be noticed that the recesses 10 and 11 extend only through a portion of the convolution face 8. However, other forms of recesses may be used which extend throughout the entire height of the face. This is shown in the modifications of Figs. 7 to 10. In these modifications left-handed threads are indicated as the invention is applicable regardless of the thread direction. The coil 25 is wound of a wire 26 having a cross-section similar to that shown in Fig. 1. Wire 26 has a slanting outer face 27 with recesses 28 which have a bottom 29 substantially parallel to face 27.

Another form of recesses is shown in Fig. 9 where the recesses 36 are so close to each other and of such a shape that the edge appears as a large number of points rather than a helical line of more or less uninterrupted length.

Whereas Fig. 9 shows a very large number of small recesses, another extreme is illustrated in Fig. 10 where the projecting edge 41 of coil 40 is planed off on the sides 42 and 43. Such planing has clearly an effect similar in character to that of the various recesses described hereinbefore.

Many modifications and alterations of the structure shown may be made without departing from the spirit and essence of the invention, which for this reason shall not be limited but by the appended claim.

I claim:

A screw thread insert for a cylindrical hole in a boss member consisting of a wire helically wound so as to form a cylindrical coil having an extreme outer diameter slightly larger than the diameter of the hole for which the coil is destined, the wire of the coil having an inner thread-forming portion and having an outer portion including one outer face substantially at right angles to the coil axis and another outer face slightly slanted in relation to the coil axis at an angle of not more than 30° so that each convolution is slightly tapered toward the one coil end which is leading when the coil is being inserted, said taper being such as to cause contraction of a convolution if an axial pressure is exerted on its said slanted face from the side of said coil end, and the helical edge formed by said outer faces being provided with a plurality of teeth-forming recesses each of which having a pair of flanks symmetrical with respect to the center line of the recess.

JOHN O. FORSTER.

REFERENCES CITED

The following references are of record in the file of this patent:

UNITED STATES PATENTS

| Number | Name | Date |
| --- | --- | --- |
| 676,622 | Gochnauer | June 18, 1901 |
| 1,966,520 | Rayner | July 17, 1934 |
| 2,386,197 | Dawson | Oct. 9, 1945 |
| 2,401,912 | Cram | June 11, 1946 |
| 2,407,879 | Hass | Sept. 17, 1946 |